US011958960B2

(12) United States Patent
Van Bommel et al.

(10) Patent No.: US 11,958,960 B2
(45) Date of Patent: Apr. 16, 2024

(54) SCRATCH RESISTANT POLYMER COMPOSITION

(71) Applicant: De Patent B.V., Venlo (NL)

(72) Inventors: Stefanus Theodorus Arnoldus Martinus Van Bommel, Velden (NL); Robert Christoffel De Waal, Venlo (NL)

(73) Assignee: De Patent B.V., Venlo (NL)

(*) Notice: Subject to any disclaimer, the term of this patent is extended or adjusted under 35 U.S.C. 154(b) by 758 days.

(21) Appl. No.: 17/042,573

(22) PCT Filed: Mar. 21, 2019

(86) PCT No.: PCT/NL2019/050175
§ 371 (c)(1),
(2) Date: Sep. 28, 2020

(87) PCT Pub. No.: WO2019/190310
PCT Pub. Date: Oct. 3, 2019

(65) Prior Publication Data
US 2021/0032447 A1   Feb. 4, 2021

(30) Foreign Application Priority Data
Mar. 29, 2018 (NL) .................................. 2020686

(51) Int. Cl.
| *C08L 23/06* | (2006.01) |
| *C08L 33/12* | (2006.01) |
| *C08L 67/04* | (2006.01) |
| *B29C 45/00* | (2006.01) |
| *B29K 23/00* | (2006.01) |
| *B29K 67/00* | (2006.01) |
| *B29K 105/00* | (2006.01) |
| *B29K 509/10* | (2006.01) |
| *B29L 31/52* | (2006.01) |

(52) U.S. Cl.
CPC .............. *C08L 23/06* (2013.01); *C08L 33/12* (2013.01); *C08L 67/04* (2013.01); *B29C 45/0001* (2013.01); *B29K 2023/065* (2013.01); *B29K 2067/046* (2013.01); *B29K 2105/0032* (2013.01); *B29K 2509/10* (2013.01); *B29L 2031/5209* (2013.01); *C08L 2201/08* (2013.01); *C08L 2205/08* (2013.01); *C08L 2207/062* (2013.01)

(58) Field of Classification Search
CPC ......... C08L 23/06; C08L 33/12; C08L 67/04; C08L 2201/08; C08L 2205/08; C08L 2207/062; B29C 45/0001; B29K 2023/065; B29K 2067/046; B29K 2105/032; B29K 2509/10; B29L 2031/5209
USPC ..................................................... 524/456
See application file for complete search history.

(56) References Cited

U.S. PATENT DOCUMENTS

| 2016/0017134 A1* | 1/2016 | Desille ................... C08L 23/12 524/451 |
| 2016/0208083 A1 | 7/2016 | Standaert et al. |
| 2016/0264776 A1 | 9/2016 | Wolfe et al. |
| 2018/0223454 A1 | 8/2018 | Martins et al. |

FOREIGN PATENT DOCUMENTS

| CN | 102276895 A | 12/2011 | |
| CN | 103288163 A | 9/2013 | |
| CN | 103585984 A | 2/2014 | |
| CN | 104045302 A | 9/2014 | |
| CN | 104174375 A | 12/2014 | |
| CN | 104174382 A | 12/2014 | |
| CN | 104176821 A | 12/2014 | |
| CN | 104310936 A | 1/2015 | |
| CN | 107964182 A | 4/2018 | |
| EP | 1975195 A1 * | 10/2008 | ............ C08J 9/0061 |
| GB | 2097408 A | 11/1982 | |
| IN | 665KON2015 | 7/2015 | |
| KR | 20050037610 A | 4/2005 | |
| MX | PA06013292 A | 10/2008 | |
| TW | 256846 B | 9/1995 | |
| WO | 2014039796 A2 | 3/2014 | |
| WO | 2016187103 A1 | 11/2016 | |

OTHER PUBLICATIONS

Mallick, Sumana, et al., "Effect of Nanoclay on the Morphology and Properties of Poly (Methyl Methacrylate)/High-Density Polyethylene Blends," Journal of Applied Polymer Science, V. 116, No. 2, pp. 1010-1020 (2010).
Zhang, Cheng, et al., "Morphology and Electrical Properties of Short Carbon Fiber-Filled Polymer Blends: High-Density Polyethylene/Poly (Methyl Methacrylate)," Journal of Applied Polymer Science, V. 69, No. 9, pp. 1813-1819 (1998).
Zhang, C., et al., "Effect of Vapor Grown Carbon Fiber on Non-Isothermal Crystallization Kinetics of HDPE/PMMA Blend," Materials Letters, V. 60, No. 8, pp. 1054-1058 (2006).
Asai, Shigeo, et al., "Effect of Interfacial Free Energy on the Heterogeneous Distribution of Oxidized Carbon Black in Polymer Blends," Polymer Journal, V. 24, No. 5, pp. 415-420 (1992).
Dutch Search Report dated Nov. 29, 2018.

* cited by examiner

Primary Examiner — Ling Siu Cho
Assistant Examiner — Ronald Grinsted
(74) Attorney, Agent, or Firm — Hoffmann & Baron, LLP

(57) ABSTRACT

Scratch resistant polymer composition, in particular for the manufacturing of rigid, scratch resistant and dimensionally stable building bricks, comprising: a) a bio-based HDPE granulate, produced from ethanol or ethylene obtained from biomass; b) an amorphous polymer and/or (semi)crystalline polymer; c) optionally a mineral filler and optionally a colouring pigment; Furthermore, a method for manufacturing an injection moulding article from the scratch resistant polymer composition is disclosed.

14 Claims, 1 Drawing Sheet

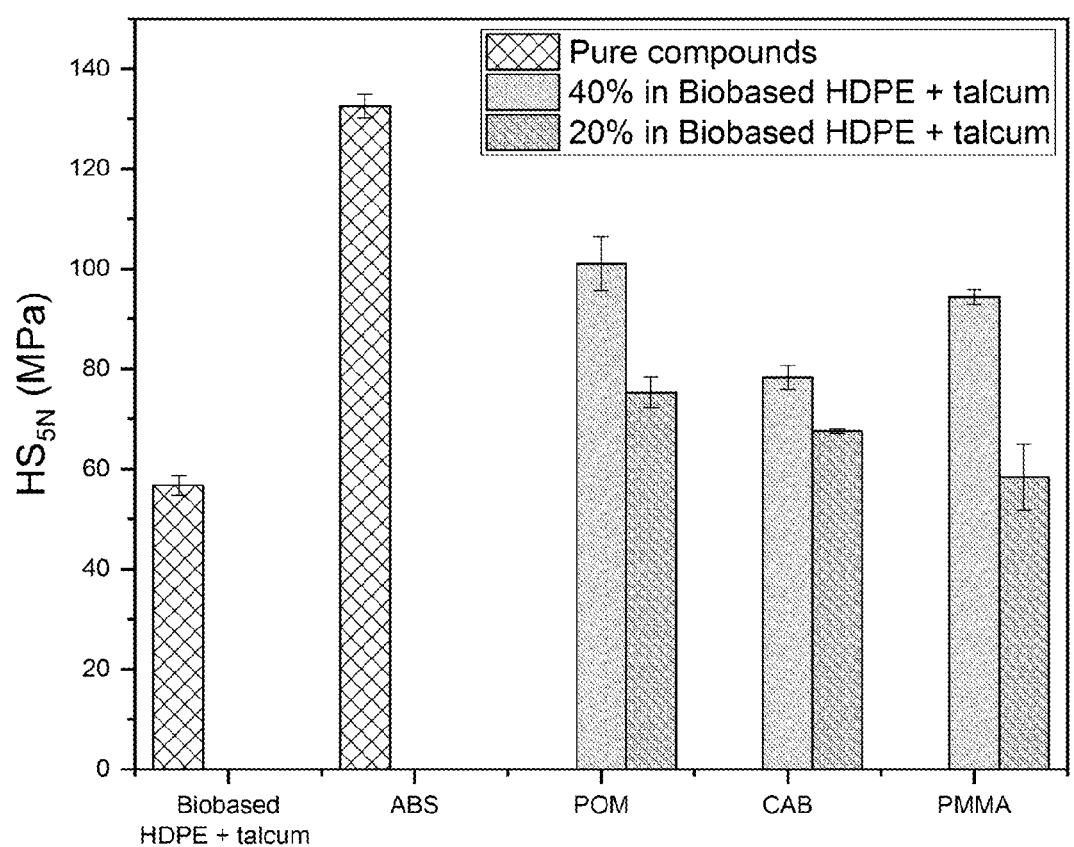

SCRATCH RESISTANT POLYMER COMPOSITION

This application is the U.S. National Phase of, and Applicant claims priority from, International Patent Application Number PCT/NL2019/050175 filed 21 Mar. 2019, which claims priority from NL 2020686 filed 29 Mar. 2018, each of which is incorporated herein by reference.

The present invention relates to scratch resistant polymer compositions and a method for manufacturing articles by injection moulding the scratch resistant polymer compositions, as well as products manufactured by the method.

Building bricks as produced and sold by the firm LEGO® are generally known. Initially these building bricks were manufactured from cellulose acetate. Nowadays these building bricks and other pieces are manufactured from ABS (acrylonitrile butadiene styrene) by injection moulding. ABS possesses an excellent dimensional stability, scratch resistance and rigidity, and is therefore eminently suitable for the production of building bricks, etc. However, it is a disadvantage that up till now and in the foreseeable future ABS is not produced from renewable resources: the ABS is obtained from fossil raw materials such as petroleum.

Object of the present invention is to provide a scratch resistant polymer composition from biomass (en.wikipedia.org/wiki/Biomass) ("green" raw materials), for example—but not exclusively—sugar-containing agricultural products such as sugar cane or sugar beet; and to provide a method for manufacturing articles including building bricks with the scratch resistant polymer composition according to the invention. Other suitable bio-based materials include cellulose polymers (e.g. cellulose acetate), polylactic acid (PLA), thermoplastic starch, polybutylene succinate (PBS) and their copolymers, polyhydroxyalkanoates (PHA). However, all these well-known "green" plastics have their specific disadvantages, and are therefore not used for the present purpose. Some of these bioplastics are sensitive to water and moisture; others have an HDT (heat deflection temperature) which is too low, or are too brittle. When the HDT is relatively low, the chance increases on unacceptable deformation of the building bricks during washing (by hand or in the dishwasher). This is in contrast to 'green' polyethylene. A plastic material, which is suitable for the present purpose, is "green, renewable", HDPE, i.e. HDPE which has been produced from ethanol obtained from (any suitable) biomass by means of conversion of said ethanol to ethylene, the monomer of ("high density" and "low density") polyethylene.

The ethanol for manufacturing the "green" HDPE can also be harnessed and obtained from other types of biomass, including wood chips (for example, also from waste wood or wood waste), straw and maize; see for example:
https://en.wikipedia.org/wiki/Corn_ethanol
https://en.wikipedia.org/wiki/Cellulosic_ethanol HDPE in itself is not sufficiently dimensionally stable, scratch resistant and rigid to be able to meet the (high) requirements, which are imposed on the above-mentioned type of articles. For this reason, the present invention proposes a method for treating, blending and processing the HDPE in order—as has been found surprisingly in practice—to obtain polymer compositions, which are suitable for producing articles including building bricks containing "green" HDPE ("HD biopolyethyleen") which has excellent properties with respect to dimensional stability, HDT, scratch resistance and rigidity.

Therefore, the invention provides for a (scratch resistant) polymer composition, in particular for injection moulding articles including building bricks, etc., based on HDPE, comprising:
 a) a bio-based HDPE granulate, produced from ethanol or ethylene obtained from biomass;
 b) an amorphous polymer and/or (semi)crystalline polymer;
 c) optionally a mineral filler and optionally a colouring pigment;

Preferable, the mineral filler is selected from a group of mineral fillers including: talcum, mica, chalk, kaolin; and the amorphous polymer and/or (semi)crystalline polymer is selected from a group of fossil-based polymers including: acrylic polymer, polyamide polymer, acetal polymer. Alternatively, the amorphous polymer and/or (semi)crystalline polymer is selected from a group of bio-based/partially bio-based polymers including: isosorbide-based polymer, cellulose ester-based polymer, polyhydroxyalkanoates (PHA), polylactic acid (PLA) based polymers, bio-based polyamide polymer.

Preferably, the product is substantially exclusively injection moulded from the polymer composition according to the invention, since the addition of an amount of HDPE granulate, i.e. HDPE granulate without the addition of, in particular, talc(um) (powder) and amorphous polymer and/or (semi)crystalline polymer will deteriorate the dimensional stability, the scratch resistance and the rigidity. In addition, working/starting from the present polymer compositions promotes the dispersion of non-polymeric parts, instead of merely mixing on the screw of an injection-moulding machine, so that there is better control over size stability (dimensional stability).

The mineral filler used preferably has a particle size distribution containing a substantial number of particles between 0 and 100 µm.

Preferably, the amount of mineral filler is in the range from about 1 wt % to about 40 wt % based on the total polymer composition; more preferably the amount of mineral filler is in the range from about 5 wt % to about 25 wt % based on the bio-based HDPE granulate; more preferably the amount of mineral filler is about 15 wt % based on the bio-based HDPE granulate.

In particular the amount of amorphous polymer and/or (semi)crystalline polymer is in the range from about 10 wt % to about 50 wt % based on the polymer composition, preferably the amount of amorphous polymer and/or (semi)crystalline polymer is in the range from about 15 wt % to about 40 wt % based on the polymer composition.

Surprisingly, it has been found that by adding talcum and amorphous polymer and/or (semi)crystalline polymer to the HDPE (bio)ethylene a polymer composition is obtained, which is dimensional stable, scratch resistant and rigid, which has a sufficiently high HDT, and which is very suitable for injection moulding articles, including building bricks.

In a first advantageous embodiment of the scratch resistant polymer composition according to the invention, the amorphous polymer contains an acrylic polymer. Acrylic polymers are defined as polymers based on acrylic acid and its homologues and their derivatives; preferably poly methyl methacrylate (PMMA).

In an alternative embodiment of the scratch resistant polymer composition according to the invention, the amorphous polymer and/or (semi)crystalline polymer contains an isosorbide building block; or in general: contains building blocks based on 1,4:3,6-dianhydrohexitols.

In another advantageous embodiment of the scratch resistant polymer composition according to the invention, the amorphous polymer and/or (semi)crystalline polymer contains a cellulose ester polymer; preferably the amorphous cellulose ester polymer is selected from the group consisting of: cellulose acetate (CA), cellulose acetate butyrate (CAB), cellulose acetate propionate, modified cellulose polymers based on methyl cellulose (MC) and ethyl cellulose (EC).

Preferably, the scratch resistant polymer composition comprises a compatiblizer and/or a scratch resistant additive; preferably the compatibilizer is selected from the group consisting of: one or more of random copolymers, block or graft copolymers, nonreactive polymers containing polar groups, reactive functional polymers (examples are anhydride-functionalized poly(propylene-co-ethylene) copolymer (PPE-MA), hydroxyl group grafted PPE (PPE-OH), secondary amine group grafted PPE (PPE-NHR)), or interfacial agents including SEBS G1650E, OPTIM E-156, ELVALOY PTW, LOTADER AX8900, and PEG2000; and preferably the scratch-resistant additive is selected from the group consisting of: silicone compounds including Genioplast Pellet S, Tegomer AntiScratch 100, Tegomer H-Si 6441P, polyester modified siloxane including Tegomer Anti-Scratch, L alkyl-modified siloxane including Cesa-scratch PEABNR12020, PPA0025889, PPA0025913, BYK-TS 3200 3201, Incroslip-G/Incroslip SL/IncoMold IncroMax.

The compatiblizer increases the solubility of the components of the polymer composition and stabilizes the polymer composition and the injection moulded articles. The scratch resistant additive further enhances the scratch resistant properties of the injection moulded articles.

It is noted that in injection moulding processes normally the polyolefin granules are mixed with a substantial quantity of blended polyolefin granules. In that case, moreover, it is generally indicated by the term of (application of) master-batch granules instead of blended polyolefin granules (see, for example:

http://www.amiplastics.com/cons/markets/compounding.aspx
http://www.colorex.nl/en/compounds.html
http://www.colorex.nl/en/masterbatches.html

EXAMPLE 1

Step a): Production of Samples

Scratch resistant polymers compositions were produced based on bio-based high-density polyethylene/talcum compound (FKUR Kunststoff GmbH, Germany), polymethylmethacrylate (PMMA) (Altuglas V920T, Altuglas International, France), Polyoxymethylene (POM) (Ultraform N2320, BASF, Germany) and Cellulose Acetate Butyrate (CAB) (Cellidor B500-05, Albis Plastic GmbH, Germany).

Scratch-resistant polymer compositions were made by dry-blending the HDPE-talcum compounds with either 20% or 40% of PMMA, POM and CAB. Acrylonitrile butadiene styrene (ABS) (Terluran GP-22, Styrosolution Group GmbH) was used as a reference material. Test specimen (80×10×4 mm) were produced on a DEMAG Ergotech NC IV 25-80 compact injection molding machine. The processing temperature profile settings were 40/190/200/220/230° C. and the mold temperature was 30° C. The processing temperature profile of ABS was 40/220/240/250/260° C. and the mold temperature was 30° C.

Step b): Determination of Scratch Hardness Numbers

The material scratch resistance was evaluated by determining the scratch hardness number according to ASTM G171-03 (2017). Scratches of 20 mm in length were made on the test specimen by applying a constant force of 5 N using a computerized CSM microscratch tester equipped with a diamond stylus with a hemispherical cone of 200 μm. The resulting scratch widths are measured using a digital microscope Keyence VHX2000 with a wide-range zoom lens (20×500× magnification). The scratch hardness number $HS_P$ was calculated by:

$$HS_P = \frac{8P}{\pi w^2} \qquad (1)$$

where:
$HS_P$=scratch hardness number in Pa
P=normal force in N and
w=scratch width in m.

The calculated scratch hardness numbers of the prepared compounds are depicted in FIG. 1.

FIG. 1 shows a graph of the scratch hardness numbers of bio-based HDPE+talcum and blends with 20/40% POM, CAB and PMMA. ABS is shown as a reference material.

From FIG. 1 it can be seen that the scratch hardness numbers increase when a Bio-based HDPE/talc compound is blended with POM, CAB or PMMA thermoplastics.

Finally, the following is noted.

In the meantime, the Brazilian plastics manufacturer BRASKEM has gained/acquired some fame by producing green polyethylene from sugar cane.

The production of ethylene is performed by dehydration of ethanol in the presence of catalysts.

During this process, contaminants formed are removed by means of a number of purification steps. The dehydration process produces water as a by-product, which can be utilized in industrial processes or in agricultural applications.

The invention claimed is:

1. Scratch resistant building bricks or other pieces of toys obtained by injection moulding a polymer composition consisting essentially of:
   a) a bio-based HDPE granulate, produced from ethanol or ethylene obtained from biomass;
   b) an amorphous and/or (semi)crystalline polylactic acid (PLA) based polymer;
   c) a mineral filler in an amount in the range from about 5 wt % to 40 wt %, based on the total polymer composition, and optionally a colouring pigment.

2. Scratch resistant building bricks or other pieces of toys according to claim 1, wherein the mineral filler is selected from a group of mineral fillers including: talcum, mica, chalk, and kaolin.

3. Scratch resistant building bricks or other pieces of toys according to claim 1, wherein the polymer composition further comprises a compatiblizer.

4. Scratch resistant building bricks or other pieces of toys according to claim 3, wherein the compatiblizer is selected from the group consisting of: one or more of random copolymers, block or graft copolymers, nonreactive polymers containing polar groups, reactive functional polymers, and interfacial agents.

5. Scratch resistant building bricks or other pieces of toys according to claim 1, wherein the polymer composition further comprises a scratch resistant additive.

6. Scratch resistant building bricks or other pieces of toys according to claim 5, wherein the scratch-resistant additive is selected from the group consisting of silicone compounds, polyester modified siloxane, and alkyl-modified siloxane.

7. Method for manufacturing an injection moulding article from a polymer composition as defined in claim 1, wherein said method comprises providing said polymer composition and injection moulding said composition into the article.

8. Articles manufactured according to the method of claim 7.

9. Scratch resistant building bricks or other pieces of toys according to claim 1, wherein the mineral filler has a particle size distribution containing particles between 0 and 100 μm.

10. Scratch resistant building bricks or other pieces of toys according to claim 1, wherein the amount of mineral filler is in the range from about 5 wt % to 25 wt %, based on the total polymer composition.

11. Scratch resistant building bricks or other pieces of toys according to claim 1, wherein the amount of mineral filler is about 15 wt % based on the total polymer composition.

12. Scratch resistant building bricks or other pieces of toys according to claim 1, wherein the amount of the amorphous and/or (semi)crystalline polylactic acid (PLA) based polymer is in the range from about 10 wt % to about 50 wt %, based on the polymer composition.

13. Scratch resistant building bricks or other pieces of toys according to claim 1, wherein the amount of the amorphous and/or (semi)crystalline polylactic acid (PLA) based polymer is in the range from about 15 wt % to 40 wt %, based on the polymer composition.

14. Articles according to claim 8, wherein the articles are building bricks.

\* \* \* \* \*